(12) United States Patent
Bronold et al.

(10) Patent No.: US 8,871,396 B2
(45) Date of Patent: Oct. 28, 2014

(54) $CO_2$ SEPARATOR FOR DIRECT METHANOL FUEL CELL SYSTEM

(75) Inventors: Matthias Bronold, Berlin (DE);
Thorsten Baumann, Berlin (DE);
Marco Gruner, Biederitz (DE);
Immanuel Rosenfeld, Berlin (DE)

(73) Assignee: Samsung SDI Co., Ltd. (KR)

( * ) Notice: Subject to any disclaimer, the term of this patent is extended or adjusted under 35 U.S.C. 154(b) by 1659 days.

(21) Appl. No.: 11/971,840

(22) Filed: Jan. 9, 2008

(65) Prior Publication Data

US 2008/0166602 A1    Jul. 10, 2008

(30) Foreign Application Priority Data

Jan. 9, 2007  (EP) .................................. 07100262
Dec. 14, 2007  (KR) ..................... 10-2007-0130979

(51) Int. Cl.
*H01M 8/06* (2006.01)
*H01M 8/04* (2006.01)
*H01M 8/10* (2006.01)

(52) U.S. Cl.
CPC ............ *H01M 8/04156* (2013.01); *Y02C 10/10* (2013.01); *H01M 8/0668* (2013.01); *H01M 8/04014* (2013.01); *Y02E 60/50* (2013.01); *Y02E 60/523* (2013.01); *H01M 8/1011* (2013.01)
USPC ......................................................... 429/412

(58) Field of Classification Search
CPC ..................... H01M 8/04014; H01M 8/04156; H01M 8/0668; H01M 8/1011; Y02E 60/50; Y02E 60/523; Y02C 10/10
USPC .................................................. 429/408–412
See application file for complete search history.

(56) References Cited

U.S. PATENT DOCUMENTS

| | | | | |
|---|---|---|---|---|
| 3,733,221 | A | * 5/1973 | Sandler et al. | ................ 429/498 |
| 3,813,461 | A | * 5/1974 | Funabashi | ........................ 264/41 |
| 4,670,359 | A | * 6/1987 | Beshty et al. | ................. 429/424 |
| 5,618,332 | A | 4/1997 | Ekiner et al. | |

(Continued)

FOREIGN PATENT DOCUMENTS

| | | |
|---|---|---|
| GB | 2 287 460 | 9/1995 |
| JP | 2001-102070 | 4/2001 |

(Continued)

OTHER PUBLICATIONS

Machine translation of JP 2005-022924 A (Uno).*

(Continued)

*Primary Examiner* — Raymond Alejandro
*Assistant Examiner* — Helen McDermott
(74) *Attorney, Agent, or Firm* — Knobbe, Martens, Olson & Bear LLP

(57) ABSTRACT

A $CO_2$ separator for a direct methanol fuel cell (DMFC) includes a single-layered membrane or a multi-layered membrane. In addition, (i) the membrane has a plurality of diffusion channels extending from an inside of the membrane to an outside of the membrane facing the inside, and mean diameters of the diffusion channels on the outside of the membrane are at least three-times greater than mean diameters of the diffusion channels on the inside of the membrane; and (ii) the inside and the outside of the membrane, and inner surfaces of the diffusion channels are hydrophobic.

11 Claims, 4 Drawing Sheets

(56) References Cited

U.S. PATENT DOCUMENTS

| | | |
|---|---|---|
| 5,871,646 A | 2/1999 | Jones et al. |
| 6,152,986 A | 11/2000 | Foller |
| 6,793,711 B1 | 9/2004 | Sammells |
| 2004/0146705 A1 | 7/2004 | Den et al. |
| 2005/0028670 A1 | 2/2005 | Regen |
| 2006/0288870 A1* | 12/2006 | Kang et al. .......................... 96/6 |
| 2006/0292418 A1* | 12/2006 | Akiyama et al. ................ 429/34 |
| 2007/0003809 A1 | 1/2007 | Luo et al. |
| 2007/0141448 A1* | 6/2007 | Ueda et al. ...................... 429/44 |
| 2007/0151703 A1* | 7/2007 | Touzov .......................... 165/45 |

FOREIGN PATENT DOCUMENTS

| | | |
|---|---|---|
| JP | 2001-110432 | 4/2001 |
| JP | 2001102070 A * | 4/2001 |
| JP | 2001-120940 | 8/2001 |
| JP | 2005022924 A * | 1/2005 |
| JP | 2006-236663 | 9/2006 |
| JP | 2006-278130 | 10/2006 |
| JP | 2007-149690 | 6/2007 |
| WO | WO 2006/017557 | 2/2006 |
| WO | WO 2006/100782 A1 | 9/2006 |
| WO | WO 2006/105771 | 10/2006 |

OTHER PUBLICATIONS

Machine translation of JP 2001102070 A (Akasaka).*

EPO Search Report for European Application No. 07 10 0262.0, Aug. 17, 2007.

First Office Action issued Mar. 25, 2011 in related Chinese Patent Application No. 200810001762.8 with English Translation.

* cited by examiner

$CO_2$ SEPARATOR FOR DIRECT METHANOL FUEL CELL SYSTEM

CROSS-REFERENCE TO RELATED APPLICATIONS

This application claims the benefit of European Patent Application No. 07 100 262.0, filed on Jan. 9, 2007 and Korean Patent Application No. 10-2007-0130979, filed on Dec. 14, 2007, the disclosures of which are incorporated by reference in their entireties.

BACKGROUND

1. Technical Field

The present disclosure relates to a $CO_2$ separator and a direct methanol fuel cell including the same.

2. Description of the Related Art

A fuel cell is a galvanic cell that converts chemical reaction energy of fuel and oxidant that are continuously fed thereto into electrical energy. In general, a fuel cell includes two electrodes that are separated by a membrane or an electrolyte. An anode is contacted by a flow of fuel, for example, hydrogen, methane, or methanol, and the fuel is oxidized at the anode. A cathode is contacted by a flow of an oxidant, for example, oxygen, hydrogen peroxide, or potassium thiocyanate, which is reduced at the cathode. Materials used for each component are typically selected depending on the type of the fuel cell.

A direct methanol fuel cell (DMFC) is a low-temperature fuel cell that typically operates within a low-temperature range of about 60° C. to 120° C. This kind of fuel cell typically uses a polymer membrane as an electrolyte. Methanol ($CH_3OH$) that is not reformed in advance is directly supplied to the anode with water, and is oxidized at the anode. Carbon dioxide ($CO_2$) is formed at the anode as a waste gas. Atmospheric oxygen supplied to the cathode as the oxidant reacts with $H^+$ ions and electrons to form water. The DMFC has several advantages, including a liquid fuel that can be stored, for example, in a plastic cartridge, which is easily stored, and which is a very inexpensive energy source. Moreover, an extensive infrastructure for methanol already exists in many fields, for example, as an anti-freeze additive in windshield washer fluids for vehicles. This type of fuel cell can provide power ranging from a few mW to hundreds of kW depending on the design of the fuel cell. In more detail, the DMFCs are suitable for portable use as substitutes or supplements for typical power sources in electronic devices. Typically, the DMFCs are used in communications and power supply of laptop computers.

Because oxidation of methanol proceeds gradually on the catalyst of the anode, various reaction pathways having various intermediate products are significant. In order to maintain a high efficiency of the fuel cell, reaction products should be rapidly removed from peripheral regions of the electrode. A liquid/gas mixture of $CO_2$, water, vapor, and unreacted methanol is formed as a result of a chemical reaction at a predetermined temperature, the mixture on which is the following discussion is based.

Therefore, a $CO_2$ separator mainly keeps water and removes $CO_2$ from the equilibrium mixture. In general, the $CO_2$ separator is installed as an additional apparatus that is connected to the fuel cell through a feed line that is common for the liquid/gas mixture. A spatial distance causes a temperature gradient, and the water condenses from the liquid/gas mixture that is cooled down slowly. The typical $CO_2$ separator separates the liquid and gas phases of the liquid/gas mixture and discharges the gaseous component, for example, into the outside environment.

The typical $CO_2$ separator has a porous membrane for separating the liquid/gas mixture. An inside of the porous membrane faces the liquid/gas mixture, and an outside of the porous membrane contacts with the outside environment. Moreover, the porous membrane is generally coated with a hydrophobic material, or can be formed of the hydrophobic material. Diffusion channels extend from the inside of the porous membrane to the outside of the porous membrane, and the channel has a size through which the liquid cannot permeate, but $CO_2$ can diffused to the outside thereof.

One of the disadvantages of the typical $CO_2$ separator is that a high level of vapor exists in the gas phase of the liquid/gas mixture because the temperature of the liquid/gas mixture is in a range of from about 60° C. to 80° C. when the mixture enters the $CO_2$ separator. However, the gaseous component of the liquid/gas mixture is further cooled while passing through the porous membrane, and condenses water therein. The condensed water blocks the diffusion channels/pores, thereby reducing the passage of $CO_2$ therethrough or completely preventing the passage of $CO_2$ therethrough in the worst case.

SUMMARY OF THE INVENTION

The present disclosure provides a $CO_2$ separator for a direct methanol fuel cell (DMFC) comprising a single-layered membrane or a multi-layered membrane.

A $CO_2$ separator separates $CO_2$ from water in a liquid/gas mixture, for example, the anode effluent from a direct methanol fuel cell. Some embodiments of a $CO_2$ separator comprises a membrane comprising an inside surface, an outside surface, and a plurality of diffusion channels that extend from the inside surface to the outside surface. The mean diameter of the diffusion channels at the outside surface are at least about three-times larger than the mean diameter of the diffusion channels at the inside surface. The inside surface, outside surface, and surfaces of the diffusion channels are hydrophobic. The membrane comprises one or more layers. The diffusion channels are sized to permit $CO_2$ gas to pass therethrough, but to prevent passage liquid water. Water that condenses within the membrane is transported to the outside surface, thereby reducing or preventing blockage or clogging of the membrane.

According to one aspect, there is provided a $CO_2$ separator for a direct methanol fuel cell (DMFC) including a single-layered membrane or a multi-layered membrane, wherein (i) the membrane has a plurality of diffusion channels extending from an inside of the membrane to an outside of the membrane facing the inside, and mean diameters of the diffusion channels on the outside of the membrane are at least three-times greater than mean diameters of the diffusion channels on the inside of the membrane; and (ii) the inside and the outside of the membrane, and inner surfaces of the diffusion channels are hydrophobic.

According to the $CO_2$ separator, a sufficient permeability of the membrane over time can be ensured in a case of a liquid/gas mixture having a high level of vapor that can occur in a temperature range from 60° C. to 80° C.

In some embodiments, the diffusion channels of the membrane should be widened from the inside to the outside of the membrane. Accordingly, water condensing at the inside of the membrane can be forced to move to the outside of the membrane. The ratio between the diameters of the diffusion channels on the inside of the membrane and the diameters of the diffusion channels on the outside of the membrane is determined by the above factor. In particular, the diameters of the diffusion channels on the outside of the membrane can vary according to an operating pressure, a temperature, and components of the mixture in a specific fuel cell system.

The diameters of the diffusion channels are measured at the inside and the outside of the membrane, and a region of the membrane close to the surface used to determine the value can extend a few µm into the interior of the membrane according to a roughness of the membrane. Pores of the diffusion channels seen from the outside can be measured using an optical method. In general, an opening of the pore is spherical, a diameter of each of the pores can be approximately determined. An arithmetic mean of the diameters of the pores is determined using a statistical averaging method, and the mean is used as a mean diameter of the diffusion channels at the inside and the outside of the membrane for determining the above mentioned factor. The mean diameter of the diffusion channels at the outside of the membrane may be greater than the mean diameter of the diffusion channels at the inside of the membrane by from about three-times to about 300-times.

Moreover, in some embodiments, all of the areas of the membrane contacting with the liquid/gas mixture is formed to be hydrophobic, on which a contact angle of a water droplet to the membrane is 90° or greater. Consequently, a surface energy of the membrane is reduced to such a degree that the water droplet is affected by an interaction with itself more strongly than an interaction with the hydrophobic surface, and thereby forming Van-der-Waals bonds. The hydrophobicity of the membrane is to make the contact angle of the water droplet to the membrane is 130° or greater.

The contact angle is an angle between the liquid droplet and the surface of a solid. The contact angle between the liquid and the solid is dependent on interactions between the materials at the contact region. The smaller the interactions are, the greater the contact angle is. In particular, the contact angle can be determined using a resisting-drop method that uses Young equation.

According to another aspect, the outside of the membrane is more hydrophobic than the inside of the membrane. Therefore, the contact angle between the droplets condensing at the outside of the membrane and the surface of the membrane can be minimized, and accordingly, the blockage of the surface area of the membrane by the droplets can be minimized. In particular, the contact angle on the inside of the membrane may be at least 130°, and the contact angle on the outside of the membrane may be at least 135°. The contact angle on the outside of the membrane may be 1° to 10° greater than that on the inside of the membrane.

According to another embodiment, the membrane includes two layers, and the two layers include the diffusion channels having different mean diameters from those of each other. A first layer defining the inside of the membrane is formed to include the diffusion channels having smaller mean diameters than those of the diffusion channels of a second layer that defines the outside of the membrane. In particular, the first layer can be more hydrophobic than the second layer. The multi-layered membrane can be realized easily by laminating layers having different porosity and hydrophobicity from each other. Obviously, the membrane having two or more layers can be sufficiently formed, although it is complex to produce the membrane.

According to another aspect, the membrane is mounted on a frame having a hydrophobic surface. The membrane can be mounted on a support structure formed as a net or a grid. However, it is very advantageous that the membrane is mounted on the frame in view of a production technical aspect, and that no support element than can reduce the permeability of the membrane exists on an active area of the membrane. A side of the frame contacts with the peripheral environment, and is cooled down more than the other side contacting with the liquid/gas mixture. Therefore, condensation of water occurs on the inner surface of the frame. When the hydrophobic material is used to form the frame, wetting of the other regions of the membrane by the water condensing on the frame can be minimized, and thus, the permeability of the membrane can be maintained. The frame may be formed of a polymer material including fluorine such as polytetrafluoroethylene (PTFE).

According to another aspect, the frame is formed of a porous hydrophobic material having a sponge-like effect. Thus, the condensed water can be diffused to outside through the frame, and thus, the possibility of wetting the membrane can be further reduced and the frame itself can support the separation of the liquid/gas mixture. Finally, a coating or an interlayer of the hydrophobic material can be arranged between the membrane and the frame. This structure is also formed to prevent the remaining regions of the membrane from being wet.

Some embodiments provide $CO_2$ separator for a fuel cell and a fuel cell system comprising the same, the $CO_2$ separator for a fuel cell comprising: a housing comprising at least one wall defining an interior and an exterior of the housing, an opening through the at least one wall, a mixer inlet, and an outlet; and a membrane comprising an inside surface and an outside surface, the membrane disposed over the opening. At least a portion of the inside surface of the membrane faces the interior of the housing, the membrane comprises a plurality of diffusion channels extending from the inside surface of the membrane to the outside surface of the membrane, mean diameter of the diffusion channels at the outside surface of the membrane are at least about three-times greater than mean diameter of the diffusion channels at the inside surface of the membrane; and the inside surface of the membrane, the outside surface of the membrane, and inner surfaces of the diffusion channels are hydrophobic.

In some embodiments, a contact angle for water of the inside surface of the membrane is at least about 130° and a contact angle for water of the outside surface of the membrane is at least about 135°. In some embodiments, the contact angle of the outside surface of the membrane is from about 1° to about 10° greater than the contact angle of the inside surface of the membrane.

In some embodiments, the membrane comprises two layers, each of the two layers comprising diffusion channels with a different mean diameter from the diffusion channels of the other layer.

In some embodiments, the membrane is mounted on a frame comprising a hydrophobic surface. In some embodiments, the frame comprises a porous hydrophobic material. Some embodiments further comprise a coating or an interlayer comprising a hydrophobic material disposed between the membrane and the frame.

In some embodiments, a first layer of the membrane comprises a stretched polytetrafluoroethylene (PTFE). In some embodiments, a second layer of the membrane comprises at least one of PTFE having pores, a fabric of polyethylene, a fabric of polyester, and felt.

In some embodiments, the mean diameter of the diffusion channels at the inside surface of the membrane are from about 0.2 µm to about 2 µm.

In some embodiments, the fuel cell system further comprises: a fuel cell stack comprising an air inlet, an air outlet, a fuel mixture inlet, and a fuel mixture outlet; a mixer fluidly connected to the outlet of the $CO_2$ separator and fluidly connected to the fuel mixture inlet; and a fuel tank fluidly connected to the mixer.

Some embodiments further comprise a heat exchanger fluidly connected to the air outlet of the fuel cell stack and a water separator fluidly connected to an outlet of the heat exchanger, wherein an outlet of the water separator is fluidly connected to the mixer.

Some embodiments further comprise an air pump fluidly connected to the air inlet of the fuel cell stack.

In some embodiments, the fuel cell stack comprises a direct methanol fuel cell stack.

Some embodiments provide a method for separating $CO_2$ from water from an anode effluent of a fuel cell stack, the method comprising: contacting an anode effluent of a fuel cell stack comprising a $CO_2$/water liquid/gas mixture with an inside surface of a membrane comprising: the inside surface, an outside surface, and a plurality of diffusion channels extending from the inside surface of the membrane to the outside surface of the membrane. The mean diameter of the diffusion channels at the outside surface of the membrane are at least about three-times greater than mean diameter of the diffusion channels at the inside surface of the membrane; the inside surface of the membrane, the outside surface of the membrane, and inner surfaces of the diffusion channels are hydrophobic; $CO_2$ diffuses to through the membrane to the outside surface thereof; and water condensed within the membrane is transported to the outside surface thereof.

In some embodiments, a temperature of the anode effluent is from about 60° C. to about 80° C. In some embodiments, anode effluent is the anode effluent of a direct methanol fuel cell stack.

BRIEF DESCRIPTION OF THE DRAWINGS

A more complete appreciation of the disclosure and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE CERTAIN EMBODIMENTS

Certain embodiments will be described in detail with reference to accompanying drawings.

Figure 1:
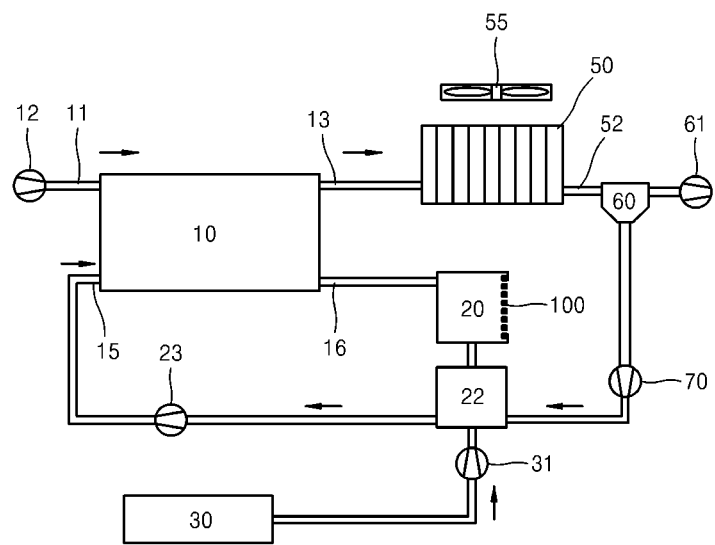
FIG. 1 is a schematic diagram of an embodiment of a DMFC including a $CO_2$ separator.

FIG. 1 schematically shows a structure of an embodiment of a direct methanol fuel cell (DMFC) including a $CO_2$ separator. The electrochemical processes of the DMFC are not described in detail herein. The electrochemical processes of the DMFC are performed in a fuel cell stack 10, and a reaction product of an anode side thereof comprises a liquid/gas mixture including $CO_2$ and water.

Air is supplied by an air pump 12 to the fuel cell stack 10 through an air inlet 11 that is located at a cathode side of the stack 10. The air is discharged through an air outlet 13 that is located at the cathode side of the fuel cell stack 10 and cooled down by a fan 55 and a heat exchanger 50. The cooled air and liquid condensed from the air are supplied to a water separator 60 from the heat exchanger 50 through a discharge opening 52 of the heat exchanger 50. The water separator 60 is fluidly connected to a water valve 61 via corresponding lines, and is also fluidly connected to a mixer 22 via a line that includes an inline water pump 70.

A fuel mixture from the mixer 22 is supplied to the fuel cell stack 10 by a mixture pump 23 through a fuel mixture inlet 15 located at the anode side.

Moreover, the fuel, that is, methanol, is supplied to the mixer 22 from a fuel tank 30 through a fuel valve 31.

The fuel cell stack 10 has a fuel mixture discharge opening or outlet 16 that is located at the anode side through which the anode reaction products or anode effluent is discharged from the fuel cell stack 10. The mixture discharge opening 16 is fluidly connected to a mixture inlet of a $CO_2$ separator 20 through a corresponding line. The $CO_2$ separator 20 further comprises an outlet fluidly connected to the mixer 22. The $CO_2$ separator 20 includes a membrane 100 that separates the liquid/gas mixture, as described in greater detail below.

Figure 2:
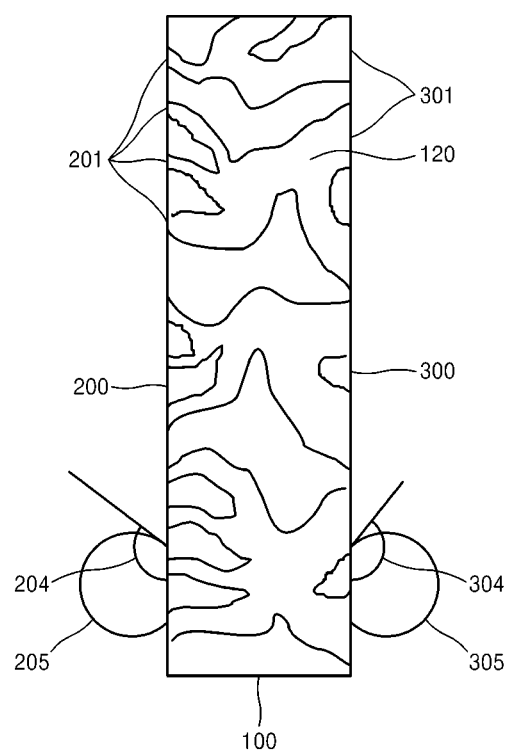
FIG. 2 is an enlarged cross-sectional view of an embodiment of a membrane useful in a $CO_2$ separator.

FIG. 2 shows an enlarged cross-sectional view of an embodiment of the membrane 100 useful in the $CO_2$ separator. In FIG. 2, the left side of the membrane 100 faces the inside of the $CO_2$ separator 20, that is, faces the liquid/gas mixture. Hereinafter, the left side of the membrane 100 will be referred to as the inside 200 thereof, and the right side of the membrane 100, in the orientation illustrated in FIG. 2, which contacts with the outside environment, will be referred to as the outside 300 thereof.

A plurality of inside pores 201, on the inside 200 of the membrane, fluidly communicate with outside pores 301, on the outside 300 of the membrane, via diffusion channels 120. Mean diameters of the inside pores 201 of the diffusion channels 120 are smaller than mean diameters of the outside pores 301 by at least a factor of about three in the illustrated embodiment.

In some embodiments, surfaces of the membrane 100 are hydrophobic on the inside 200 and the outside 300 of the membrane 100, as well as inside of the diffusion channels 120.

The combination of diffusion channels 120 that become wider from the inside 200 to the outside 300, in conjunction with the hydrophobic inside surfaces of the diffusion channels 120 provides a driving force that transports water droplets, which condense in the membrane 100, to the outside 300. It is believed that the transport through the membrane results from a negative temperature gradient in the membrane 100 because repulsive interactions between the water droplets and the hydrophobic inside surfaces of the diffusion channels 120 are reduced as the pore sizes of the diffusion channels 120 increase therethrough. The driving force towards the outside 300 causes gas flow towards the outside 300 through the diffusion channels 120. Accordingly, blockage of the diffusion channels 120 by water droplets that condense within the membrane 100, as well as a reduction in gas separation effect can be reduced and/or prevented.

In the embodiment illustrated in FIG. 2, a contact angle 204 on the inside 200 of the membrane 100 is greater than about 130°, or sufficient to hold a liquid droplet 205 of water. Similarly, a contact angle 304 on the outside 300 of the membrane 100 is greater than about 135°. When the contact angle 304 on the outside 300 of the membrane 100 is very large, a water droplet 305 condensed on the outside 300 contracts into a nearly ideal spherical shape, thereby minimizing a contact area between the water droplet 305 and the outside 300. In this way, the number of diffusion channels 120 that are blocked by water droplets can be reduced and/or minimized, and the surface area of the water droplets can be maximized to be re-evaporated.

Figure 3:
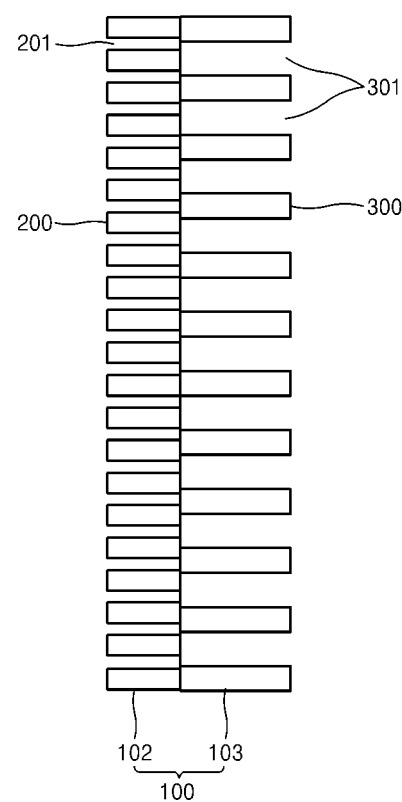
FIG. 3 is a cross-sectional view of an embodiment of another type of membrane useful in a $CO_2$ separator.

FIG. 3 is a cross-sectional view of another embodiment of the membrane 100 useful in the $CO_2$ separator. The membrane 100 of FIG. 3 includes a first layer 102 and a second layer 103 contacting each other in the illustrated embodiment.

In some embodiments, the first layer 102 comprises a stretched polytetrafluoroethylene (PTFE) layer having pores with a mean diameter of from about 0.2 μm to 2 μm. The second layer 103 can comprise at least one of PTFE having pores, a fabric of polyethylene, a fabric of polyester, felt, and the like. The two layers 102 and 103 can be coupled or secured to each other by any suitable method, for example, using a thermal process.

In the embodiment illustrated in FIG. 3, the pores of the second layer 103 have diameters of at least about three-times greater than diameters of the pores in the first layer 102. The contact angle on both of the first and second layers 102 and 103 may be at least 130°. The second layer 103 may be formed such that the contact angle on the outside 300 is at least 135°.

Figure 4:
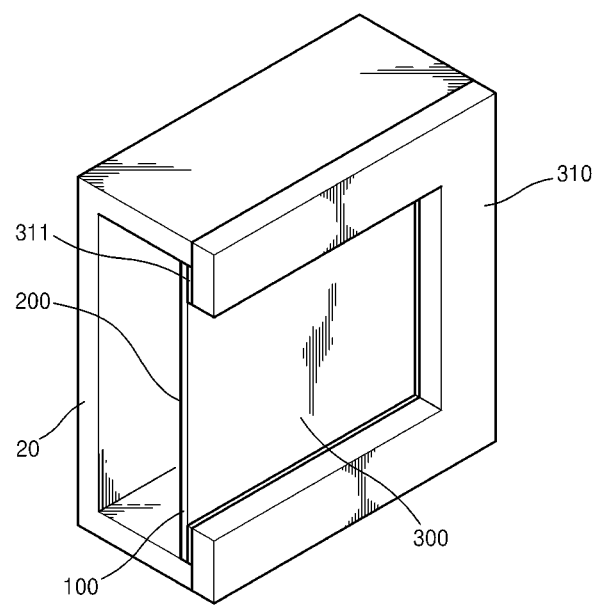
FIG. 4 shows perspective view of an embodiment of a $CO_2$ separator.

FIG. 4 shows a perspective view of another embodiment of a $CO_2$ separator 20. In the embodiment of FIG. 4, the membrane 100 is mounted over an opening in a wall of a housing of the $CO_2$ separator 20 using a frame 310 with at least a portion of the inside 200 of the membrane facing the interior of the housing of the $CO_2$ separator 20 and at least a portion of the outside 300 of the membrane facing the exterior of the housing. The frame 310 comprises PTFE in the illustrated embodiment. An interlayer or a coating 311 disposed between the outside 300 of the membrane and the frame 310 reduces and/or prevents wetting between the interface between the membrane 100 and the frame 310. In some embodiments, the interlayer 311 comprises a hydrophobic material, for example PTFE.

Figure 5:
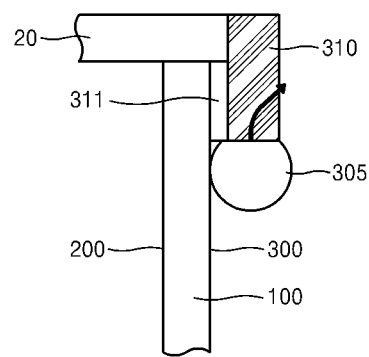
FIG. 5 shows a cross-section of another embodiment of a part of a $CO_2$ separator.

FIG. 5 shows a cross section of a part of a $CO_2$ separator 20 according to another embodiment. In the embodiment of FIG. 5, the frame 310 comprises a porous hydrophobic material. Because the frame 310 contacts the outside environment and the inside of the $CO_2$ separator 20 which is fluidly connected to the fuel cell system, the temperature of the frame 310 will be lower than the temperature of the gas mixture comprising $CO_2$ and vapor that is discharged through the membrane 100. In particular, in the region at and/or proximal to the frame 310, the gas mixture will be cooled down, which causes condensation of water. Therefore, the blockage of the pores in the membrane 100 caused by the water droplets 305 can be worse at and around the region of the frame 310.

The frame 310 comprising the porous hydrophobic material shows a sponge-like effect, and thus, the water droplets 305 are absorbed by the outside 300 of the membrane as indicated by the arrow in FIG. 4, and can be vaporized due to a relatively large surface area of the frame 310.

In order to reduce and/or prevent the membrane 100 from wetting at an interface between the membrane 100 and the frame 310, a hydrophobic interlayer or a coating 311 comprising, for example, PTFE, can be arranged between the frame 310 and the membrane 100.

The $CO_2$ separator 20 can be installed so that an air flow therefrom can pass over the membrane 100 and the frame 310. Through this structure, the separation of the water and $CO_2$ can be accelerated.

While certain exemplary embodiments have been particularly shown and described herein, it will be understood by those of ordinary skill in the art that various changes in the form and details may be made therein without departing from the spirit and scope of the present as disclosure, the scope of which is defined by the claims.

What is claimed is:

1. A $CO_2$ separator incorporated in a fuel cell system and configured to separate $CO_2$ from water, comprising:
   a housing comprising at least one wall defining an interior and an exterior of the housing, an opening through the at least one wall, a mixer inlet, and an outlet; and
   a membrane with a single layered structure comprising an inside surface and an outside surface, wherein the membrane is disposed over the opening and is mounted on a frame comprising a hydrophobic surface, wherein at least a portion of the inside surface of the membrane faces the interior of the housing, wherein the membrane comprises a plurality of diffusion channels extending from the inside surface of the membrane to the outside surface of the membrane, wherein a mean diameter of the diffusion channels at the outside surface of the membrane is at least about three-times greater than a mean diameter of the diffusion channels at the inside surface of the membrane, wherein the mean diameter of the diffusion channels at the inside surface of the membrane is from about 0.2 μm to about 2 μm, wherein the inside surface of the membrane, the outside surface of the membrane, and inner surfaces of the diffusion channels are hydrophobic, and wherein the outside surface of the membrane is more hydrophobic than the inside surface of the membrane.

2. The $CO_2$ separator of claim 1, wherein a contact angle for water of the inside surface of the membrane is at least about 130° and a contact angle for water of the outside surface of the membrane is at least about 135°.

3. The $CO_2$ separator of claim 2, wherein the contact angle of the outside surface of the membrane is from about 1° to about 10° greater than the contact angle of the inside surface of the membrane.

4. The $CO_2$ separator of claim 1, wherein the membrane comprises a stretched polytetrafluoroethylene (PTFE).

5. The $CO_2$ separator of claim 1, wherein the membrane is formed of PTFE having pores, a fabric of polyethylene, a fabric of polyester, or felt.

6. The $CO_2$ separator of claim 1, wherein the frame comprises a porous hydrophobic material.

7. The $CO_2$ separator of claim 6 further comprising an interlayer comprising a hydrophobic material disposed between the membrane and the frame.

8. A fuel cell system comprising:
   a fuel cell stack comprising an air inlet, an air outlet, a fuel mixture inlet, and a fuel mixture outlet;
   the $CO_2$ separator of claim 1 fluidly connected to the fuel mixture outlet;
   a mixer fluidly connected to the outlet of the $CO_2$ separator and fluidly connected to the fuel mixture inlet; and
   a fuel tank fluidly connected to the mixer.

9. The fuel cell system of claim 8 further comprising a heat exchanger fluidly connected to the air outlet of the fuel cell stack and a water separator fluidly connected to an outlet of the heat exchanger, wherein an outlet of the water separator is fluidly connected to the mixer.

10. The fuel cell system of claim 8 further comprising an air pump fluidly connected to the air inlet of the fuel cell stack.

11. The fuel cell system of claim 8, wherein the fuel cell stack comprises a direct methanol fuel cell stack.

* * * * *